United States Patent [19]

Hatanaka et al.

[11] 4,062,667
[45] Dec. 13, 1977

[54] METHOD OF MELTING RAW MATERIALS FOR GLASS

[75] Inventors: Kyohei Hatanaka; Hajime Inoue, both of Matsusaka; Haruya Hisatomi, Kamifukuoka; Koya Okuda, Chiba; Takeshi Suzuki, Himeji; Mikio Murao; Susumu Utiyama, both of Kobe, all of Japan

[73] Assignees: Central Glass Co., Ltd., Ube; Kawasaki Jukogyo Kabushiki Kaisha, Kobe, both of Japan

[21] Appl. No.: 725,554

[22] Filed: Sept. 22, 1976

[30] Foreign Application Priority Data

Sept. 27, 1975 Japan .............................. 50-116655
Sept. 27, 1975 Japan .............................. 50-116659
Sept. 27, 1975 Japan .............................. 50-116660
Sept. 27, 1975 Japan .............................. 50-116662

[51] Int. Cl.² .......................................... C03B 5/16
[52] U.S. Cl. ............................................ 65/135; 65/27; 65/335
[58] Field of Search ................... 65/335, 134, 135, 27

[56] References Cited

U.S. PATENT DOCUMENTS

| 3,185,554 | 5/1965 | Sweo et al. ............... 65/335 X |
| 3,880,639 | 4/1975 | Bodner et al. ............ 65/135 X |

FOREIGN PATENT DOCUMENTS 486,447  11/1929  Germany .............................. 65/335

*Primary Examiner*—Arthur D. Kellogg
*Attorney, Agent, or Firm*—Blanchard, Flynn, Thiel, Bouteil & Tanis

[57] ABSTRACT

A method of melting the raw materials for preparing glass, which method comprises feeding powdery or granular raw materials for preparing glass successively into flames jetting out of burners along the sloped furnace bed of a melting furnace, letting said raw materials fall onto the furnace bed at a location away from the position of the inlet for raw materials while heating them with said flames as well as the combustion gas, melting the raw materials for glass that land on the furnace bed by heating with said flames, and pouring the thus melted raw materials into a glass tank furnace from the side of the melting furnace where the burners are provided.

24 Claims, 13 Drawing Figures

→ AIR
--- COMBUSTION WASTE GAS
······ GLASS RAW MATERIALS

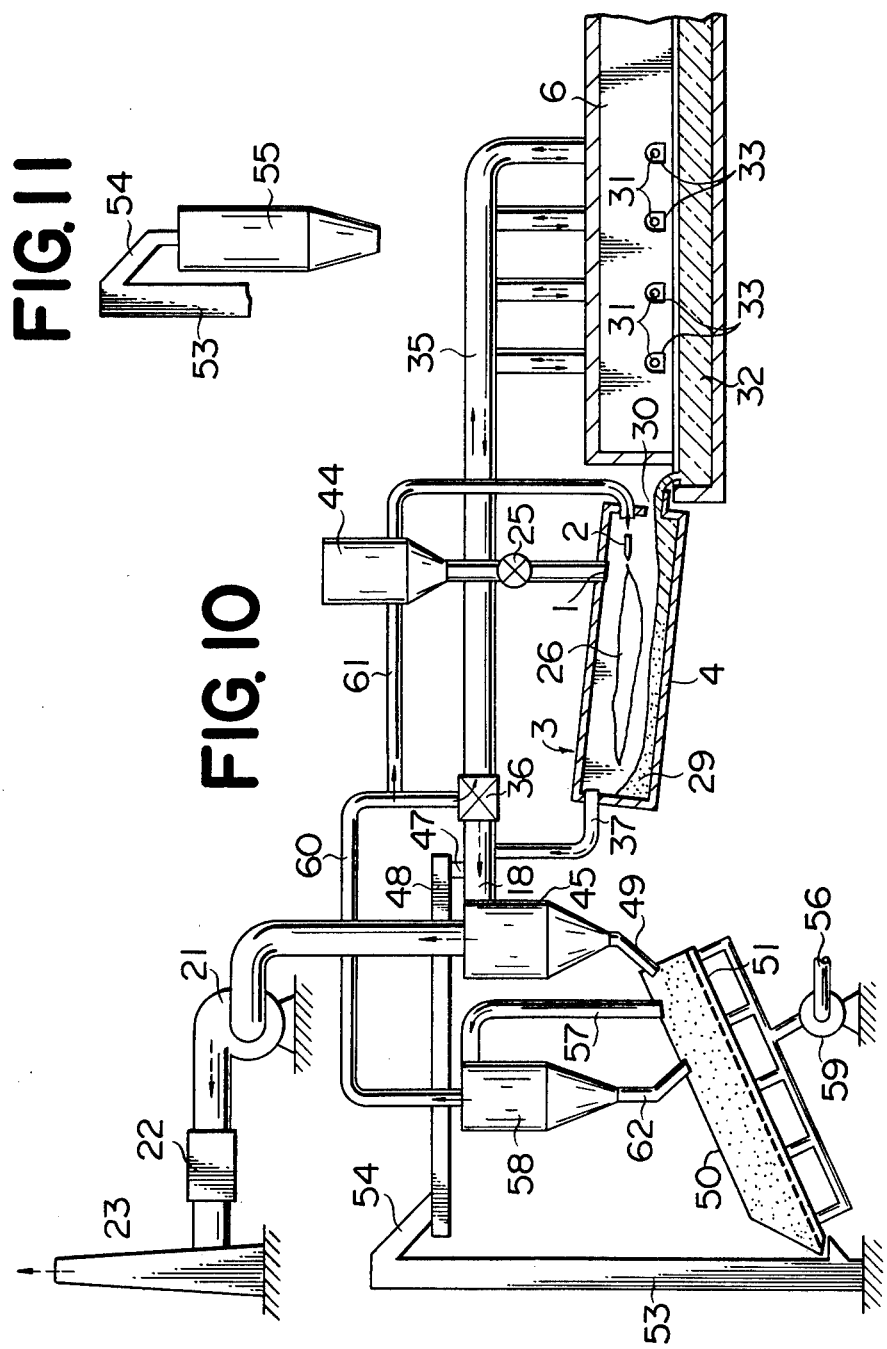

METHOD OF MELTING RAW MATERIALS FOR GLASS

BACKGROUND OF THE INVENTION a. Field of the Invention

The present invention relates to a method for melting the raw materials for preparing glass, and particularly it is intended to provide a method for melting the raw materials for glass which renders it possible not only to reduce the fuel consumption by enhancing the melting efficiency but also to effect uniform melting.

b. Description of the Prior Art

In the industrial manufacturing of flat glass, container glass, glass fiber, etc., a large-sized furnace, or a tank furnace, is usually employed, and the melting of the raw materials for glass is effected by a process comprising piling up the raw materials, to wit, quartz sand, soda ash, dolomite, etc. supplied in proportion to the amount of glass to be drawn out of the furnace, on molten glass and melting said raw materials by conductive heat from the molten glass together with the radiant heat of flames.

However, in the case of melting the raw materials for glass by the conventional method as above, the thermal efficiency is very low. This is mainly due to the fact that, according to the conventional method wherein the surface portion of the raw materials placed on the molten glass is melted by means of the radiant heat from flames while the bottom portion thereof is melted by means of the conductive heat from the molten glass successively and the thus melted raw materials flow into the molten glass, the surface layer portion of raw materials is vitrified easily by virtue of the radiant heat of the flames, but the thus vitrified surface layer portion of the raw materials impedes the conduction of the radiant heat of the flames to the underlying layer of raw materials. In order to effect the melting sufficiently by heating with flames, the upper layer of the raw materials for glass must be melted with flames and rapidly flow into the molten glass, but, as a matter of fact, the melt of the thus melted raw materials is of such a high viscosity that its rapid flowing into the molten glass is infeasible and, accordingly, a tremendous amount of fuel is required for the melting of raw materials for glass.

Moreover, in the conventional method, the raw materials for glass melted with the heat conducted from the molten glass are supposed to flow into the molten glass by virtue of natural convection of the molten glass. However, the speed of said convection is so low that the melted raw materials cannot flow into the molten glass rapidly, and this also constitutes a cause of the lowering of the thermal efficiency of the method.

As discussed in the foregoing, it is impossible to operate a glass tank furnace at a high thermal efficiency by the melting method in the prior art.

SUMMARY OF THE INVENTION

The present invention is intended to provide a method of melting the raw materials for glass which is free from the aforementioned drawbacks of the conventional method of melting the raw materials for glass. To be precise, the present invention relates to a method of melting the raw materials for glass which comprises feeding powdery or pelleted raw materials successively into flames jetting out of burners along the sloped furnace bed of a melting furnace letting said raw materials fall onto the furnace bed at a location away from the position of the inlet for said raw materials while heating them with said flames as well as the combustion gas, melting said raw materials on the furnace bed by heating same with said flames, and pouring the thus melted raw materials in a succeeding glass tank furnace from the side where the burners are provided. In the following, the furnace for melting the raw materials will be referred to as the primary furnace and the succeeding glass tank furnace will be referred to as the secondary furnace for convenience' sake.

DESCRIPTION OF THE PREFERRED EMBODIMENTS

Particulars of the present invention will be explained with reference to one embodiment illustrated in the appended drawings in the first place, and thereafter other modes of practicing the invention will be explained.

In the appended drawings:

FIG. 10 is a side view of FIG. 9 with some of the parts being shown in cross-section;

FIG. 11 is a view of a modified portion of the apparatus of FIG. 10;

Figure 1:
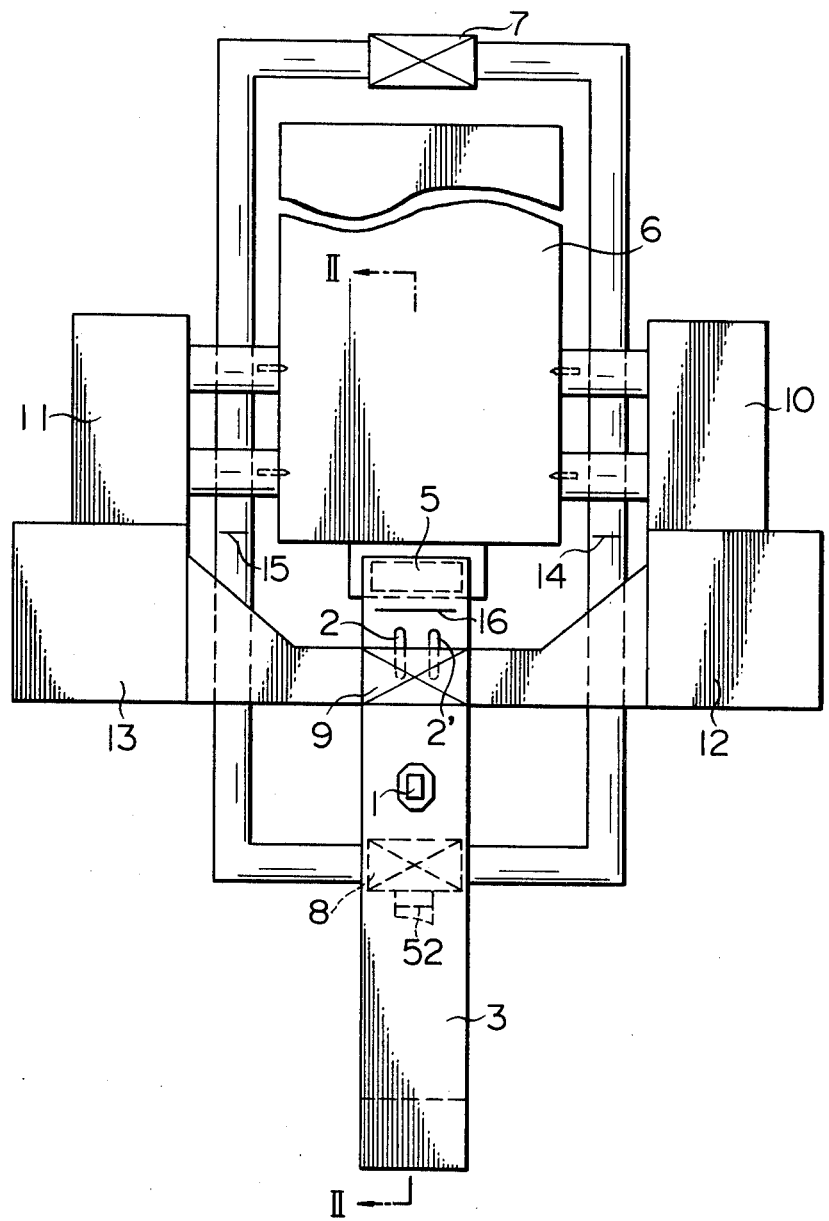
FIG. 1 is a plane view of one example of the glass melting furnace which may be utilized in practicing the present invention.
Figure 2:
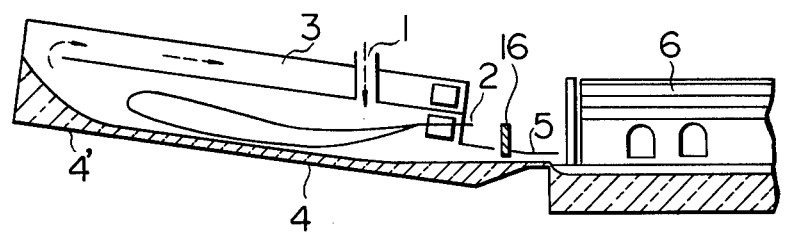
FIG. 2 is a sectional view taken along the line II—II in FIG. 1.

Referring to FIG. 1 and FIG. 2, the powdery or pelleted raw materials for glass fed through the inlet 1 for raw materials are heated with flames jetting out of the burners 2, 2' while being conveyed by said flames toward the higher portion 4' of the furnace bed of the primary furnace 3.

Since the furnace bed 4 of the primary furnace 3 is inclined at a prescribed angle as shown in FIG. 2, the raw materials are subjected to heating with flames jetting out of the burners 2 while being conveyed by said flames toward the higher portion 4' of the primary furnace 3. Said raw materials then move along the furnace bed 4 toward the side where the burners are disposed and are melted by the radiant heat of the flames and enter one end of the secondary furnace 6 via the coupling member 5 while having their viscosity lessened. The secondary furnace 6 is a well-known glass tank furnace, and the molten glass therein is subjected to refining by re-heating and moves toward the glass discharge portion of the opposite end of the furnace.

On the occasion of performing the melting of the raw materials for glass according to the method of the present invention, care must be taken concerning the angle of fixing of the burner, the capacity of the burner, the grain size of the raw materials to be melted, the angle of inclination of the furnace bed, etc. In other words, inasmuch as the raw materials put in the primary furnace 3 through the inlet 1 for raw materials are conveyed to the higher portion 4' of the furnace bed 4 by flames jetting out of the burners 2, 2' whereby the residence time for the raw materials is prolonged and the heating thereof with flames jetting out of the burners 2, 2' is effected during the thus prolonged residence time, a failure in exact selection of the grain size the raw materials and the angle of inclination as well as the capacity of the burners would cause a trouble that a sufficient heating cannot be performed at the time when the raw materials have landed on the higher portion 4' of the furnace bed 4. Moreover, in the case where the angle of inclination of the furnace bed 4 is not appropriate, the inflow to the secondary furnace 6 from the primary furnace 3 cannot be constant causing a grave obstacle to obtaining a uniform molten glass. That is, the raw materials after landing on the higher portion 4' of the furnace bed 4 move back toward the side where the burners are disposed by virtue of the inclination of the furnace bed 4 while having their viscosity lessened gradually. When the angle of inclination of the furnace bed is not selected appropriately in proportion to the lessening of the viscosity of the vitrified raw materials, the flow of the molten glass stagnates, causing accumulation thereof. However, these matters belong to the problems pertaining to the design of the furnace and do not limit the scope of the present invention per se.

The summary of the invention is as described above with reference to FIG. 1 and FIG. 2. Now, in the following will be explained the flow of the air for combustion as well as the waste gas arising from combustion in the same apparatus illustrated in FIG. 1 and FIG. 2. The raw materials for glass put in through the inlet for raw materials provided on the primary furnace 3 are heated with flames jetting out of the burners 2, 2' disposed in the vicinity of said inlet for raw materials and land on the heated furnace bed as set forth above, and the taking-in of the air for combustion required on this occasion and the discharge of the waste gas arising from combustion are performed by regulating in the following way by means of the controlling dampers 7, 8, 9 which are interlocked. For instance, in the case of using the regenerator 12, the air inlet of the regenerator 12 is opened by the damper 7, and the air for combustion taken in the regenerator 12 from the atmosphere is heated in said regenerator 12, enters the primary furnace 3, promotes the combustion of the burners 2, 2', becomes a combustion waste gas, is conducted to the regenerator 13 with the actuation of the damper 9 thereby to heat said regenerator 13, and thereafter is conducted to the stack with the actuation of the damper 8. When the temperature of the regenerator 12 falls, with the actuation of the dampers 7, 8, 9, the route of the foregoing air for combustion as well as the combustion waste gas is altered, and the air passes through the sufficiently heated regenerator 13, enters the primary furnace 3, becomes a combustion waste gas, passes through the regenerator 12, and is conducted to the stack via the damper 8.

As to the route of the air for combustion as well as the combustion waste gas in the secondary furnace 6, as is well known, in the case where the damper 7 at the air inlet is actuated so as to use the regenerator 10, the side of the damper 8 for waste gas communicating with the regenerator 10 is closed and, accordingly, the air for combustion is heated within the regenerator 10, contributes to the combustion within the secondary furnace 6, heats the regenerator 11 as the combustion waste gas, and thereafter is conducted to the stack with the actuation of the damper 8. When the temperature of the regenerator 10 falls, the dampers 7, 8 work in the direction opposite to the foregoing and, accordingly, the route of the air for combustion as well as the combustion waste gas become opposite to the foregoing route.

Further, in the case of using the regenerators 10, 12, the amount of air to be distributed to the regenerators 10, 12 is controlled by adjusting the degree of opening of the damper 14 provided within the flue, and in the case of using the regenerators 11, 13, the amount of air to be distributed to the regenerators 11, 13, is controlled by adjusting the degree of opening of the damper 15. The partially illustrated main damper 52 is used for the purpose of controlling the pressure of the primary furnace 3 as well as the secondary furnace 6, together with the dampers 14, 15. Moreover, on this side of the coupling member 5 is provided the tweel 16 capable of vertical movement whose lower end dips into the molten glass, thereby rendering it possible to prevent the leakage of the gas coming out of the gas coming out of the primary furnace 3 and, at the same time, to perform the adjustment of the outflow of the molten glass by vertically moving said tweel 16.

In the primary furnace according to the present invention illustrated by FIG. 1 and FIG. 2 above, inasmuch as the raw materials for glass are heated with flames jetting out of burners until they fall on the furnace bed and are further heated while flowing along the furnace bed thereafter, and moreover the raw materials in the course of falling are possessed of a very large area for heat transmission compared with that of the conventional method, the thermal efficiency is markedly improved compared with the conventional melting furnace devised to put the raw materials for glass on the molten glass thereby to melt said raw materials.

Next, other embodiments of the apparatus for use in practicing the method according to the present invention, wherein the disposition of the primary furnace has been modified, will be explained hereunder.

Figure 4:
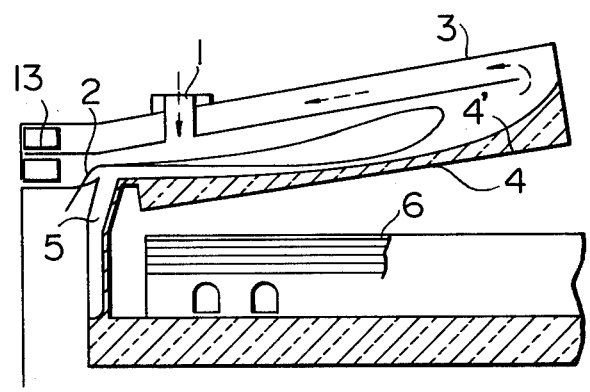
FIG. 4 is a sectional view taken along the line IV—IV in FIG. 3.
Figure 3:
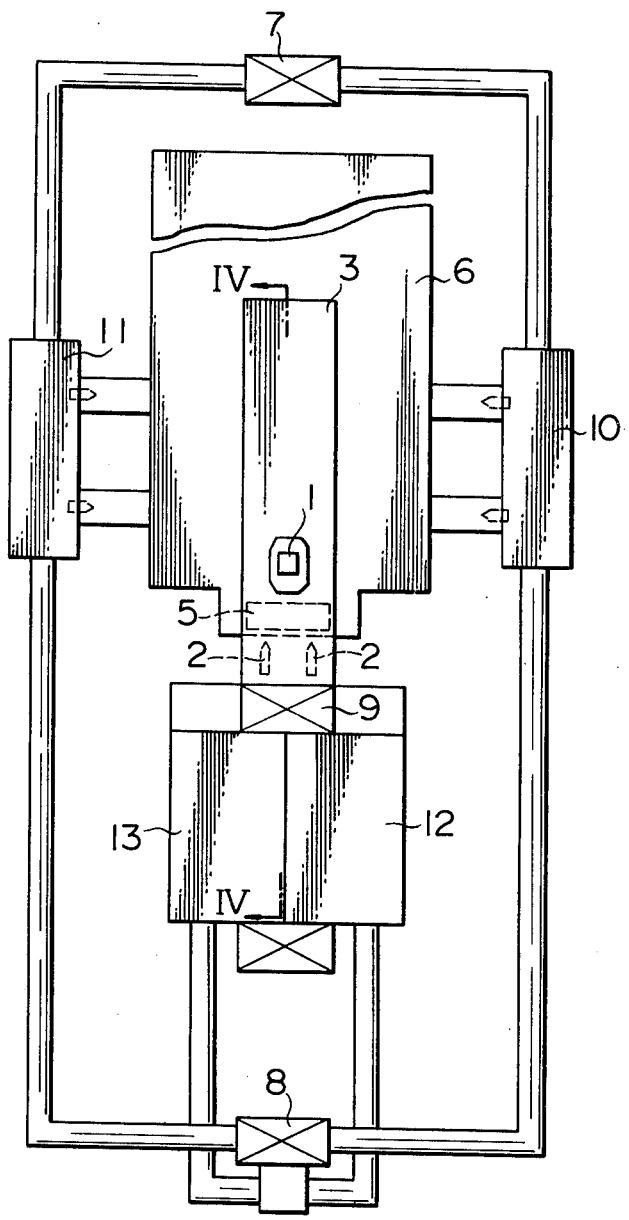
FIG. 3 is a plane view of another melting furnace which may be utilized in practicing the present invention.
Figure 5:
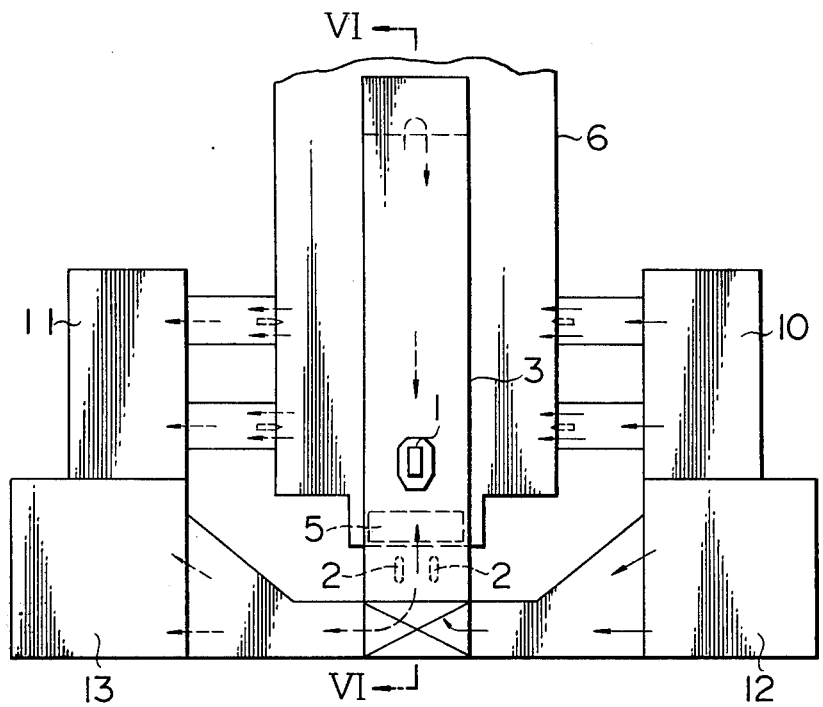
FIG. 5 is a plane view of still another melting furnace which may be utilized in practicing the present invention.
Figure 6:
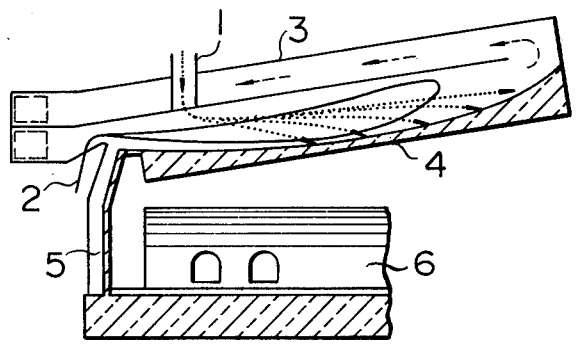
FIG. 6 is a sectional view taken along the line VI—VI in FIG. 5.

FIG. 3 coupled with FIG. 4 and FIG. 5 coupled with FIG. 6 are diagrammatic representations of two other apparatuses which may be utilized in practicing the present invention. As to the reference numerals used in these drawings, those parts which have a function in common with the corresponding parts of the apparatus shown in FIG. 1 and FIG. 2 are identified by the identical reference numerals respectively. These two embodiments are theoretically the same as the apparatus illustrated by FIG. 1 and FIG. 2 save for relative modification of the disposition of the primary and the secondary furnace, and there is no difference of function of the respective apparatuses as a whole.

In the case of the apparatus illustrated by FIG. 3 and FIG. 4, the primary furnace is disposed above the secondary furnace by orienting the two in opposite directions, and the regenerators and accessory devices are disposed in front of the secondary furnace separately from the secondary furnace. In the case of the apparatus illustrated by FIG. 5 and FIG. 6, the regenerator is the same as that in the apparatus illustrated by FIG. 1 and FIG. 2 save for the disposition of the primary furnace alone above the secondary furnace.

All of the furnace beds for the primary furnace is for use in the present invention exemplified in the drawings are of rising gradient, that is, their bottom walls are inclined upwardly in a direction away from the burners. However, application of a furnace bed of falling gradient will do as well. In the case where a furnace bed of falling gradient is employed, the innermost portion of the furnace bed, to wit, the portion opposite to the position of the burners will contain a pool of molten glass, the quality of glass is make uniform and the viscosity thereof is lowered so that the molten glass will be able to overflow the pool easily and move to the side where the burners are provided. The degree of inclination of the furnace bed has theoretically a bearing on merely the difference of the effect of making the molten glass stream flow down and the effect of making it overflow the pool thereof, so that illustration thereof is omitted herein. Nevertheless, it is convenient to attach some means for adjusting the angle of inclination to the apparatus, though it is not particularly illustrated herein. When occasion demands, the furnace can also be easily so designed as to switch over to the rising gradient from the falling gradient, and vice versa, at will.

As will be understood from the above description, according to the present invention, the design for the primary furnace can be worked out fairly freely: for instance, the primary furnace may be disposed by orienting it to form a specific angle in the plane view, e.g., a right angle, relative to the secondary furnace. This verifies that the present invention is not only effective to reduce the fuel consumption but also is effective in the efficient use of and the cost of the equipment and the area for installing the equipment. As to the construction as well as the effect of these embodiments, it is considered apparent from the description of the apparatus illustrated by FIG. 1 and FIG. 2, explanation thereof will be dispensed with herein.

Figure 7:
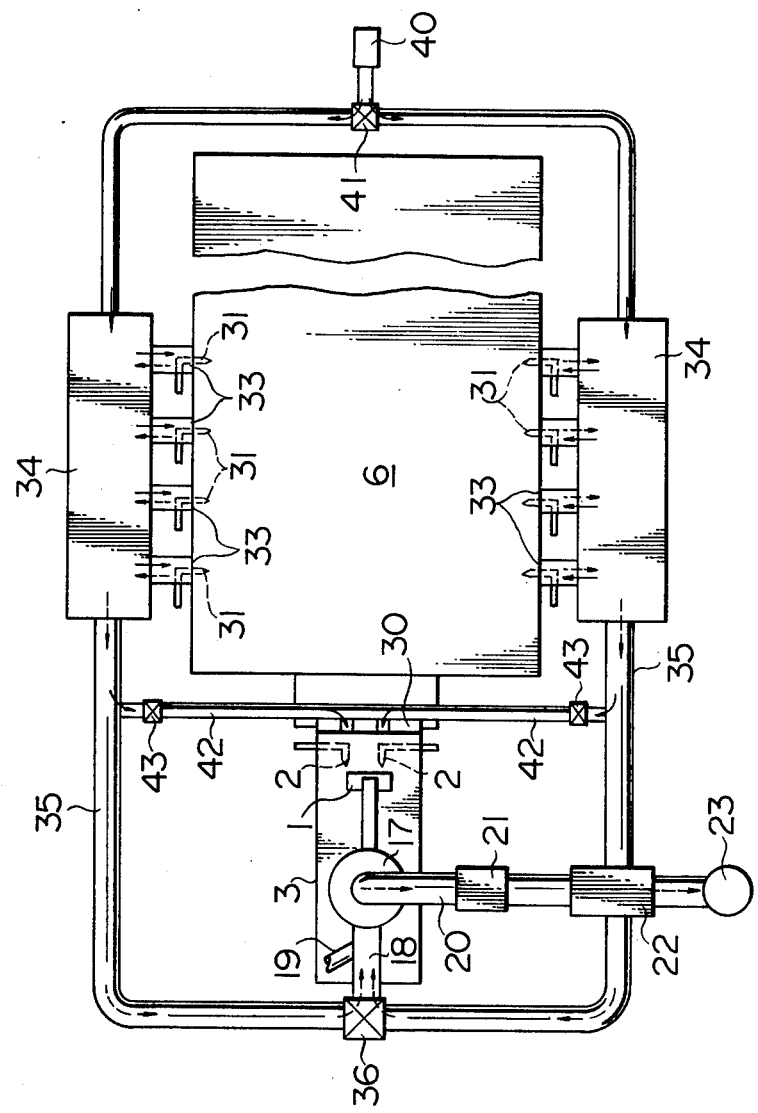
FIG. 7 is a plan view of yet another apparatus for practicing the present invention.
Figure 8:
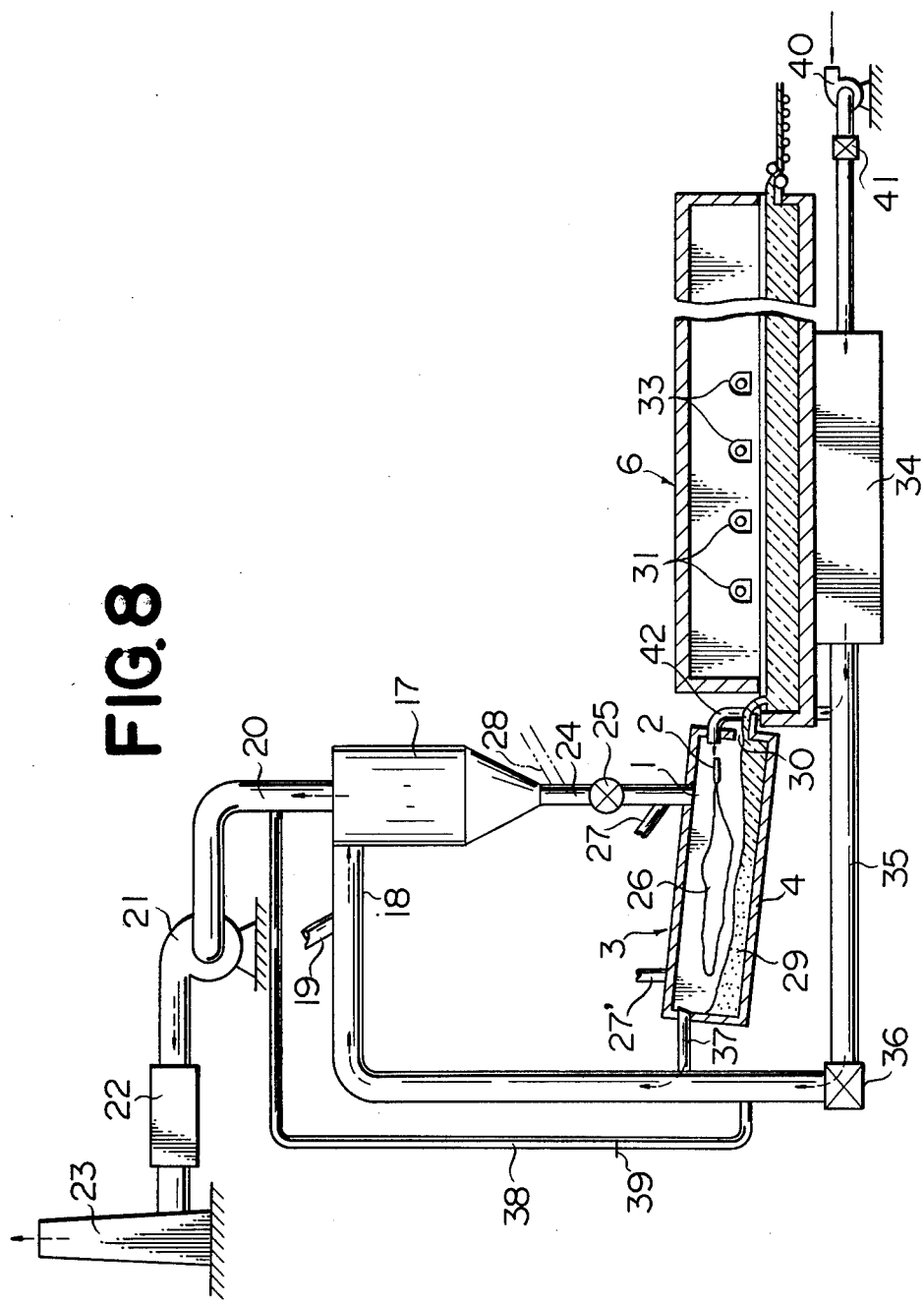
FIG. 8 is a side view of FIG. 7 with some of the parts being shown in cross-section.

According to the present invention, the raw materials for glass can be further heated with the high-temperature combustion waste gas discharged from the primary and secondary furnace as shown in FIGS. 7 and 8.

In FIG. 7 and FIG. 8, the reference numeral 17 denotes a cyclone connected with the inlet for raw materials 1. To this cyclone 17 is conducted the high-temperature combustion waste gas exhausted from the secondary furnace 6 and the primary furnace 3 through the inlet duct 18. On this side of the inlet for conducting said combustion waste gas into the cyclone from the inlet duct 18 there is provided an inlet 19 for raw materials through which the powdery raw materials for glass admixed and conveyed by an appropriate conveying means are supplied and are subjected to heating with the combustion waste gas having a high temperature within the inlet duct 18.

The high-temperature combustion waste gas containing the thus supplied powdery raw materials for glass is separated from the powdery raw materials within the cyclone 17, passed through the outlet duct 20, the blower 21 and the air pollution preventive device 22 performing desulfurization, denitration, etc. so as to make it harmless, and then discharged through the stack 23. The powdery raw materials separated from the high-temperature waste gas by means of the cyclone 17 are put into the flames 26 directly from the inlet 1 for raw materials after passing through the chute 24 of the cyclone 17 and the air-lock device 25. In this connection, in the case of admixing carbon as a raw material for glass, because said carbon is more apt to scatter and is quantitatively less than its fellow raw materials, that carbon may not be separated completely from the combustion waste gas within the cyclone 17 and may be discharged together with the combustion waste gas. Therefore, it will be effective to supply carbon through the inlet 27 adjacent to the inlet 1 for raw materials. Moreover, inasmuch as the cullet which is used for the purpose of facilitating the melting of the raw materials for glass is usually in the form of coarse grains compared with the fellow raw materials and there is danger that it will damage the wall of the cyclone 17 if it is put into the high-temperature combustion waste gas together with powdery raw materials for glass through the inlet 19 for raw materials, it will be effective to supply it either through said inlet 27 together with carbon or through another inlet 27' disposed above the upper end of the sloped furnace bed whereon the powdery raw materials for glass, which are conveyed while being heated with flames 26 in the primary furnace 3, are supposed to fall so as to pile up thereon. Furthermore, it also will be effective to provide a cullet chute 28 on the upper part of the chute 24 to utilize the characteristic of cullet that it is usually in the form of coarse grains and put the cullet in this cullet chute 28 so as to remove the deposit of powdery raw materials arising on the inner wall of the chute 24 by making the coarse grains of cullet strike against said deposit, or to put the cullet in the inlet 19 for raw materials from time to time together with fellow powdery raw materials so as to remove scales that form on the inner wall of the cyclone 17 in the same way as in the case of the chute 24.

In the case of feeding the cullet separately from the powdery raw materials as described in the foregoing, it is more expedient to take out a part of the combustion waste gas from the duct therefor and send it into the cullet storing tank thereby to heat the cullet before feeding it as above.

The powdery raw materials thus preheated with the combustion waste gas are directly fed into flames 26 from the inlet for raw materials and are further heated while being conveyed forwardly by the current of combustion gas. The powdery raw materials being conveyed within flames 26 toward the uppermost end of the sloped furnace bed fall on the upper part of the sloped furnace bed 4 on account of the effects of gravity. The raw materials 29 having thus fallen on the upper part of the sloped furnace bed 4 are next subjected to heating with flames 26 so as to be melted and vitrified successively, and stream down along the sloped furnace bed 4. Even in the course of thus streaming down, the heating with flames 26 continues so that the vitrified raw materials arriving at the lowermost end of the sloped furnace bed 4 are possessed of an increased fluidity sufficient for streaming down into the secondary furnace 6 through the inlet 30. The vitrified raw materials thus supplied to the secondary furnace 6 are heated with flames jetting out of the heating burners 31 disposed bilaterally along the furnace 6 and are melted thoroughly to become the molten glass 32. This molten glass 32 is drawn out after the fining process and is made into products. Further, by devising the primary furnace 3 to be variable with respect to the angle of inclination thereof, the residence time of the raw materials for glass within the furnace 3 can be adjusted, and also the grade of molten glass to be supplied to the secondary furnace 6 through the inlet 30 can be controlled.

At the place where the heating burners 31 are installed are provided the ports 33 which function as the blow-off ports for the air for combustion and the exhaust port for the combustion waste gas concurrently. The heating burners 31 on the left side and those on the right side are alternately used in a prescribed cycle, and from the ports 33 for the burners 31 on one side in use is supplied the air for combustion as preheated within the regenerator 34 while from the ports 33 for the burners 31 on the other side is discharged the high-temperature combustion waste gas, and this combustion waste gas is utilized for heating the checker bricks of the regenerator 34 and is sent to the bilateral flue ducts 35 thereafter. In the appended drawings, the flow of the air for combustion is indicated by arrows with solid line and the flow of waste gas is indicated by arrow with dotted line. The high-temperature combustion waste gas sent to the flue duct 35 is conducted to the inlet duct 18 via the exchanging damper 36, passed through the cyclone 17 where the supply of powdery raw materials for glass is to be performed as described in the foregoing, and then released to the atmosphere from the stack 23. On this side of the joint of the inlet duct 18 and the duct 37 for the waste gas from the primary furnace 3, the by-pass pipe 38 is equipped on the outlet duct 20, said by-pass pipe 38 being provided with the controlling valve 39 for the purpose of controlling the pressure of the secondary furnace 6.

The exchanging damper 36 can be properly switched over to right and left depending on the alternate use of the right-side and left-side heating burners 31. Meanwhile, air is taken in by the blower 40 and, depending on the alternate use of the right-side and left-side heating burners 31, is sent to the regenerator 34 on the side in use, whereby it is heated while passing the regenerator 34 and is supplied from the ports 33. A portion of the thus heated air is sent to the air supply pipe 42 for the purpose of supplying the heated air to the primary furnace 3 and is conducted to said furnace 3. The joint of the air supply pipe 42 and the flue ducts 35 is provided with the damper 43, said damper 43 being devised to open and close depending on the alternate flow of the heated air in the bilateral flue ducts 35.

In the above described embodiments, the primary furnace 3 is sloped downward toward the secondary furnace 6, but it also will do to use a furnace sloped downward oppositely. And, the use of such a melting furnace for raw materials has an advantage that, inasmuch as a fixed amount of melted raw materials for glass stays in the lower part of the melting furnace, succeeding raw materials for glass put in the primary furnace 3 are heated with flames 26 together with the melted raw materials staying therein and can be melted in a short space of time compared with the case of the melting furnace employed in the above described embodiments.

As stated above, according to the present invention, the heat energy possessed by the high-temperature waste gas can be utilized efficiently as the powdery raw materials for glass are heated with the high-temperature waste gas, which has hitherto been used merely for heating the checker bricks of regenerator, and at the same time, the heat energy possessed by the combustion flames as well as the combustion gas can be utilized to the fullest extent by putting the powdery raw materials for glass directly into the combustion flames, so that its contribution to the economy of energy is indeed remarkable.

Moreover, according to the present invention, by virtue of admixing carbon and cullet separately from fellow raw materials for glass, at the time of preheating the powdery raw materials for glass by making the materials in suspension state contact with the high-temperature combustion waste gas, the loss of carbon due to scattering thereof as well as the damage on the apparatus ascribable to the cullet can be prevented.

Figure 9:
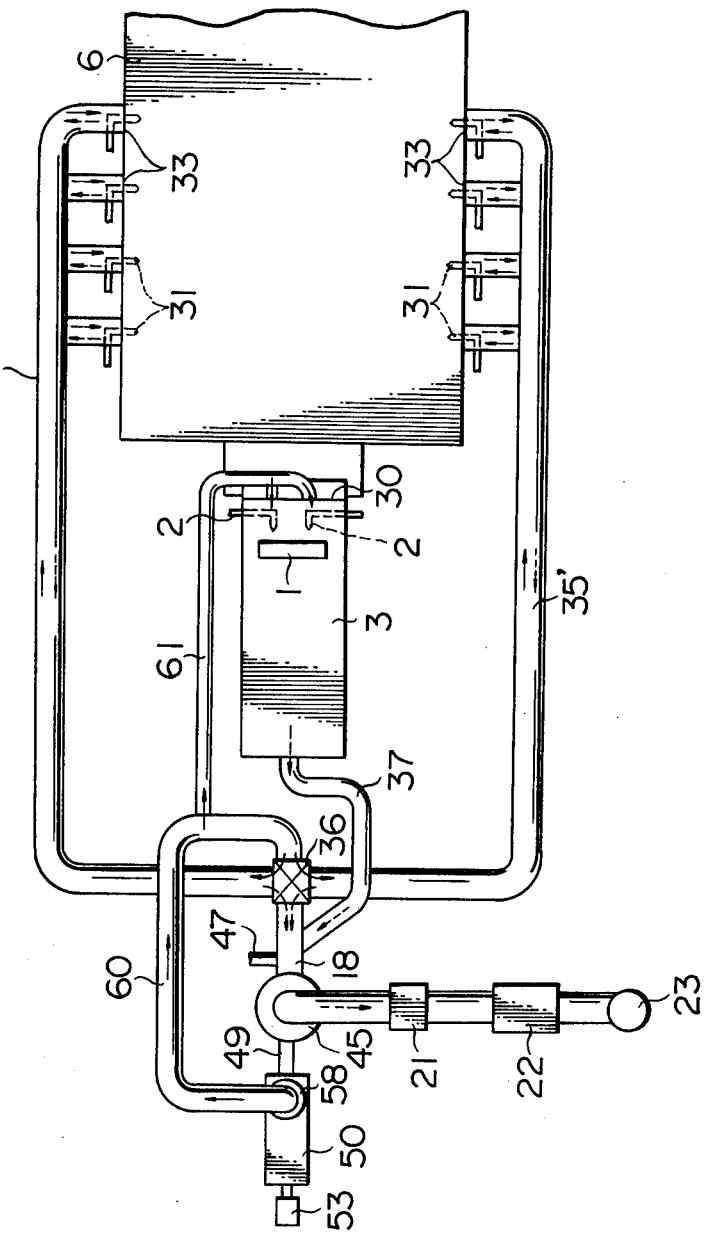
FIG. 9 is a plan view of a fragment of a modified apparatus.

Furthermore, in the present invention, it is possible to so devise as to heat at least one ingredient of the raw materials for glass with the high-temperature combustion waste gas exhausted from the melting furnace and heat the air for combustion with the thus heated ingredient as the heat exchanging medium. This mode of practicing the method of the present invention will be described in the following with reference to FIG. 9, FIG. 10 and FIG. 11.

In this method, the raw materials for glass are continuously supplied by a fixed amount at a time to the primary furnace 3 from the batch tank 44 by means of the feeding device 25. The combustion waste gas exhausted from the ports 33 flows through the flue ducts 35, 35' in the direction of arrow with dotted line, passes the exchanging damper 36, and is conducted to the cyclone 45 via the inlet duct 18 for combustion waste gas. Meanwhile, the high-temperature combustion waste gas exhausted from the primary furnace 3 passes the duct 37 and flows into the inlet duct 18. On this side of the inlet through which the high-temperature combustion waste gas flows in the cyclone 45 from the inlet duct 18 there is provided the inlet 47 through which at least one ingredient of the raw materials for glass is put into the high-temperature combustion waste gas as the heat exchanging medium, and said heat exchanging medium is successively supplied to the inlet 47 by means of an appropriate feeding device 48 for said heat exchanging medium consisting of belt conveyor, screw conveyor and the like. The powdery heat exchanging medium put into the current of high-temperature combustion waste gas is separated from the combustion waste gas by means of the cyclone 45 after being subjected to heating. In this connection, the powdery substances contained in the combustion waste gas from the primary furnace 3 are preferably separated by providing another cyclone not shown in the drawings in the first part of the cyclone 45. The combustion waste gas after separating from powdery substances and transmitting its heat to the heat exchanging medium is induced by the blower 21, passed through the air pollution preventive device 22 performing desulfurization, denitration, etc., and released into the atmosphere.

The heat exchanging medium as separated by means of the cyclone 45 and the high-temperature powdery substances coming from the primary furnace 3 are exhausted into the heat exchange chamber 50 via the duct 49. The heat exchange chamber 50 has a floor 51, said floor being devised such that the bottom face thereof is scattered with air-injection nozzles with regulated injection angle and distribution through which air is jetted into the heat exchange chamber 50, thereby forming a fluidized bed with said air and heat exchanging medium so as to effect heat exchange therebetween, while said medium is made to move in regular succession, falls in the bucket elevator 53 at the lower extremity of the floor, is conveyed upward by said elevator 53 and is supplied to the feeding device 48 through the chute 54.

In this way, the heat exchanging medium is used by cycling. Further, in the case where the heat exchanging medium is put in the tank 55 from the chute 54 as illustrated in FIG. 11, transferred to the compounding process from the tank 55 and used as an ingredient of the raw materials for glass, in lieu of repeated using it by cycling as above, the preheating of the raw materials for glass is feasible and the fuel for melting the raw materials for glass can be economized.

In the course of movement of the heat exchanging medium within the heat exchange chamber 50 as above, the air for combustion taken in the blower 59 through the air inlet 56 contacts with the heat exchanging medium 46 to be heated thereby, and the thus heated air enters the cyclone 58 via the conduit 57, is separated from the accompanying powdery substances by means of said cyclone 58, and is sent to the ports 33 by way of the conduit 60, the exchanging damper 36 and the flue ducts 35,35'. The conduit 60 is provided with the branched pipe 61 through which a portion of the air is sent to the burners 2.

The exchanging damper 36 is so devised that, when the combustion gas is being supplied from the flue duct 35, the heated air from the conduit 60 is sent in the flue duct 35', and when the combustion gas is being supplied from the flue duct 35', the heated air from the conduit 60 is sent in the flue duct 35.

The powdery substances separated from the heated air coming from the cyclone 58 are returned to the heat exchange chamber 50 by way of the chute 62 and reused for heating air.

As the medium for use in the present invention, among various powdery substances useful as raw material for glass, quartz sand is preferable for it is free from decomposition even when admixed with a large quantity of raw materials and contacted with a high-temperature combustion waste gas. However, subject to thermal control of the high-temperature combustion waste gas to a certain degree, such substances as dolomite, etc. having less hardness compared with quartz sand may be applied as well: in this case, damages on machinery and tools, e.g., cyclone 45, etc. can be lessened compared with the case of using quartz sand. As the device for use in performing the heat exchange between the heat exchanging medium and air, various devices, e.g., a device capable of forming spouted bed or fluidized bed, a device combining those devices with a cyclone, etc. are applicable.

As stated above, according to the present invention, inasmuch as the powdery raw materials for glass are put into combustion flames and heated therewith, the raw materials can be melted very efficiently. Besides, as the heat exchanging medium which is supplied successively is heated with the high-temperature combustion waste gas and the thus heated medium is used for heating the air for combustion to be supplied to the burner ports, said air is heated with the heated medium supplied afresh in succession, and therefore, there occurs no thermal fluctuations with the lapse of time such as seen in the case of heating by means of the conventional regenerator and heating at a constant temperature is ensured, so that it is very profitable from the view point of the operation of furnaces. Moreover, inasmuch as said medium is a substance useful as a raw material for glass, by utilizing the medium still holding a high temperature after heating the air, preheating of the raw materials for glass can be performed and the fuel for melting the raw materials can be economized. Further, inasmuch as the heat exchanging medium is powdery, the contact area thereof to come in touch with the high-temperature combustion waste gas is by far great compared with that of the checker brick within the conventional regenerator, so that it has a conspicuous effect of taking in the heat energy possessed by the high-temperature combustion waste gas by far efficiently. What is more, it has an economical effect of dispensing with the conventional regenerator which used to be constructed at a huge expense.

Figure 12:
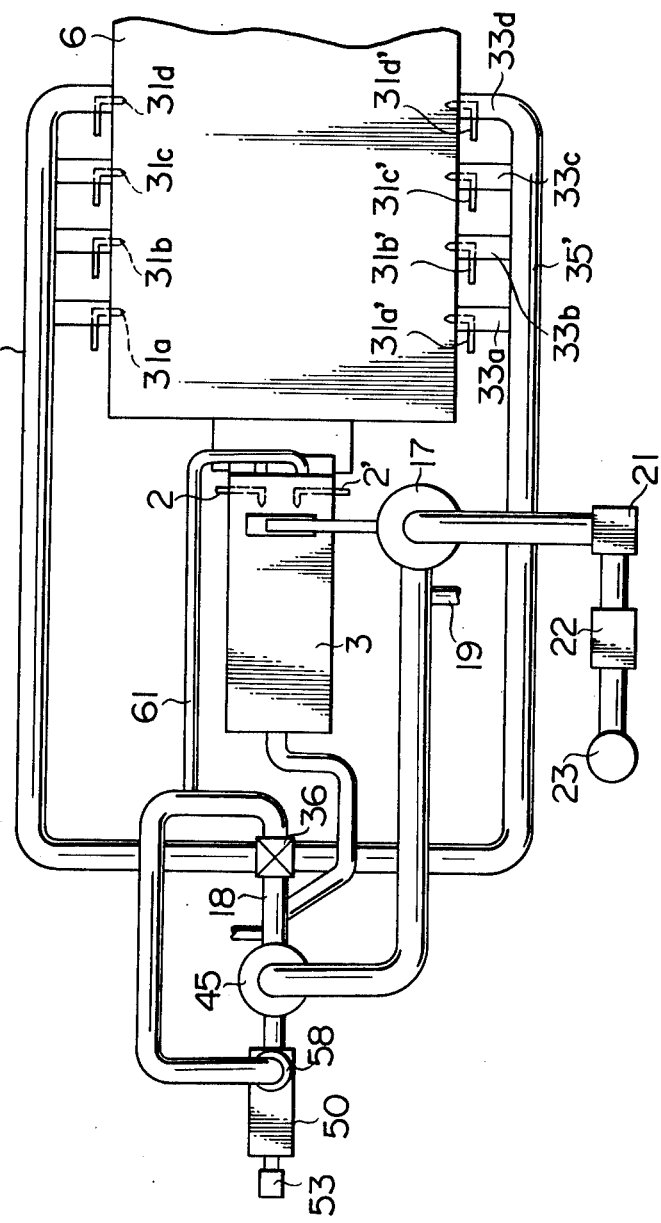
FIG. 12 is a plan view of a fragment of another modified apparatus.
Figure 13:
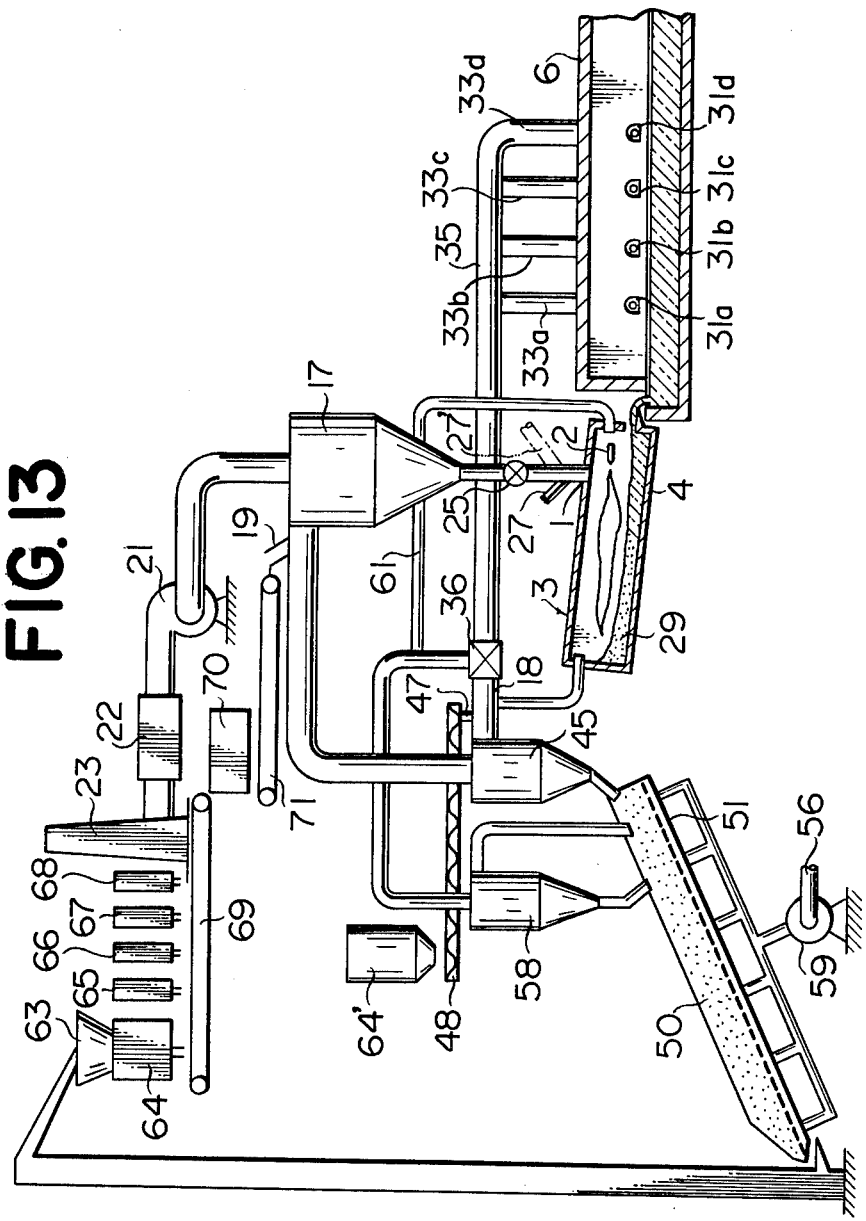
FIG. 13 is a side view of FIG. 12 with some of the parts being shown in cross-section.

In the present invention, it is possible to heat the heat exchanging medium after heating the air for combustion and fellow raw materials for glass by the use of the combustion waste gas after heating the heat exchanging medium. It is also possible to supply cullet and carbon to be used as raw material for glass, together with the heat exchanging medium subjected to heating with the combustion waste gas and fellow raw materials for glass, to the primary furnace. Hereunder will be explained these methods with reference to FIG. 12 and FIG. 13.

In the present invention, it is devised to perform the heat exchange between the combustion waste gas arising from the primary and/or the secondary furnace and the air for combustion so as to heat the air for combustion, thereby rendering it possible to dispense with the regenerators of the primary and/or the secondary furnace.

Further, it is devised to conduct the combustion waste gas in the duct-cyclone system for use in preheating the raw materials for glass thereby making said waste gas serviceable in heating the raw materials for glass too. Moreover, it is devised to apply a constituent substance (substances) of the raw materials for glass as the heat exchanging medium and further use said substance(s) as the raw material for glass, thereby facilitating the melting of the raw materials for glass and drastically enhancing the thermal efficiency. In this connection, it is preferable to conduct the combustion waste gas containing powder of the raw materials for glass into another cyclone not shown in the drawings thereby to remove and recover said powder from the waste gas. To explain the flow of the combustion waste gas for heating the air for combustion as well as the raw materials for glass, in FIG. 12 and FIG. 13, the combustion waste gas arising from the primary furnace is drawn by the blower 21 for said waste gas and enters the cyclone 45 by way of the inlet duct 18. The combustion waste gas arising from the burners 31a, 31b, 31c, 31d of the secondary furnace 6 flows through the ports 33a, 33b, 33c, 33d, passes the flue duct 35' and the exchanging damper 36, and performs heat exchange between a raw material for glass, e.g., quartz sand, put in the inlet duct 18 disposed on this side of the cyclone 45, together with the waste gas arising in the primary furnace 3. The combustion waste gas after performing heat exchange between said raw material for glass enters the cyclone 17, heats other raw materials for glass excluding cullet and carbon put in by way of the duct disposed on this side of the cyclone 17, and is released into the atmosphere from the stack 23 via the blower 21 and the dust catcher 22. Meanwhile, the air for combustion is taken in the heat exchange chamber 50 through the opening thereof, and performs heat exchange between the raw material for glass utilized as the heat exchanging medium which is heated by heat exchange with the waste gas and utilized as the heat exchanging medium. A part of the raw material for glass, which is sent in the cyclone 58 from the cyclone 45 via the floor 51 is removed within the cyclone 58. The air for combustion is sent in by the blower 59 and a portion thereof is supplied to the primary furnace 3 by way of the branched pipe 61, while the remaining portion is supplied to the secondary furnace 6 by way of the flue duct 35' through the exchanging damper 36, and both portions become waste gas after combustion and enter the cyclone 45 through the afore described route. The first group of burners consisting of 31a, 31b, 31c and 31d and the second group of burners consisting of 31a', 31b', 31c' and 31d' in the secondary furnace 6 are devised to perform combustion alternately by switching over at intervals of a fixed time so as to heat the molten glass uniformly, and the switchover of the two groups of burners and the motions of the exchanging damper 36 are interlocked. The raw materials for glass exclusive of carbon and cullet are compounded and, subsequent to a sufficient heating by heat exchange with the waste gas in the duct disposed on the side of the cyclone 17, are put in the cyclone 17. And, after separation from the waste gas in this cyclone 17, the raw materials for glass are put in the primary furnace 3 through the inlet for raw materials 1.

The raw material for glass to serve as the heat exchanging medium, e.g., quartz sand, is put in the cyclone 45 through the inlet 47 by means of the feeding device 48, to wit, screw conveyor, heated through heat exchange with the waste gas, and thereafter discharged into the heat exchange chamber 50. The heat exchange chamber 50 has a floor 51, said floor being such that the bottom face thereof is scattered with air-injection nozzles with regulated injection angle and distribution through which air is jetted into the heat exchange chamber 50, heat exchange is effected between said air and the exchanging medium, while said medium is made to move downward in regular succession. Gas moves downward successively and is conveyed to the hopper 63 by means of the bucket elevator 53. The quartz sand conveyed to the hopper 63 is weighed by the weighing feeder 64, conveyed to the mixer 70 by means of the conveyor 69 together with fellow raw materials for glass, to wit, soda ash, dolomite, lime stone, etc. measured with the respective weighing feeder 65, 66, 67, 68, to be mixed together therein, and thereafter put in the cyclone 17 through the inlet for raw materials 19 by means of the conveyor 71. As to the raw material serving as the heat exchanging medium, it will do either to use it as a component of glass as described above or to use it as a mere heat exchanging medium by putting in the hopper 64' and recycling. The heat exchange chamber 50 is not limited to the type described hereinabove; any other type, e.g., duct-cyclone type, etc., is of course applicable.

Cullet and carbon as the material for glass are put in the primary furnace 3 by way of their inlet 27 separately from fellow raw materials for glass, to wit, quartz sand, dolomite, soda ash, lime stone, etc. The reason is that, when carbon and cullet are put in the duct-cyclone 17 by way of the inlet for raw materials 19, inasmuch as said cullet is usually employed in the form of coarse grains, it causes abrasion of the lining of the cyclone 17 thereby drastically shortening the life of said cyclone, while carbon is very likely to be discharged together with the waste gas as it is apt to fly apart and is small in quantity. Carbon and cullet may be put in the primary furnace 3 either separately or simultaneously: in the case of simultaneously putting the two, cullet and carbon are thoroughly admixed by the mixer 70 and an exact quantity of the admixture relative to quartz sand, soda ash, dolomite, lime stone, etc. is put in by way of the inlet for carbon and cullet 27, while in the case of separately putting the two, the inlets 27, 27' are used. Further, it also will do to put said cullet by way of the inlet for raw materials 19 together with powdery fellow raw materials from time to time so as to remove scales arising on the inner wall of the cyclone 17 by utilizing the characteristic of cullet that it is usually in the form of coarse grains.

As will be understood from the foregoing descriptions, the present invention is intended to provide a method of melting the raw materials for glass which demonstrates by far superior thermal efficiency compared with the conventional glass tank furnace by virtue of the use of the combustion waste gas arising in the primary and the secondary furnace in preheating of the air for combustion and in heating of a specific material among the raw materials for glass serving as the heat exchanging medium at the time of said preheating and further in heating fellow raw materials for glass exclusive of cullet and carbon, coupled with the improved thermal efficiency of the primary furnace.

What is claimed is:

1. A method of continuously melting particulate ingredients for making glass, in a melting furnace having an elongated substantially horizontally disposed melting chamber, said chamber having a sloped bottom wall, said melting furnace having burner means located at one horizontal end of said melting chamber and arranged for directing jet-like flame means toward the opposite horizontal end of said melting chamber above said bottom wall, said melting chamber having outlet means for molten ingredients at said one horizontal end of said melting chamber and below said burner means, which comprises the steps of continuously feeding a stream of said ingredients into substantially horizontally directed jet-like flame means issuing from said burner means, said ingredients having a particle size selected so that the particles are suspended in said flame means and remain in contact therewith for a prolonged time for being heated thereby and said ingredients simultaneously are projected by said flame means substantially horizontally through said melting chamber and above said bottom wall thereof toward said opposite horizontal end of said melting chamber until said ingredients drop downwardly, by the effects of gravity, onto said bottom wall at a zone horizontally spaced from said one horizontal end of said melting furnace, the ingredients resting on said bottom wall being further heated by said flame means and said gaseous products of combustion flowing thereabove whereby to melt said ingredients to form a melt on said bottom wall;

flowing said melt along said bottom wall in a direction opposite to the direction of flow of said flame means and said gaseous products of combustion and located directly therebelow so that said melt flows to said outlet means at said one horizontal end of said melting chamber;

removing said melt from said melting chamber through said outlet means and feeding said melt into a glass tank furnace.

2. A method according to claim 1, including the steps of discharging high temperature combustion exhaust gases from said melting furnace and said glass tank furnace, and preheating said ingredients by passing them in heat exchange relationship with said exhaust gases prior to feeding said ingredients into said flame means in said melting furnace.

3. A method according to claim 2, including the step of feeding carbon and/or cullet into the stream of said preheated ingredients being fed into said flame means in said melting furnace.

4. A method according to claim 2 including the step of feeding cullet directly into said melting furnace.

5. A method according to claim 1, including the steps of discharging high temperature combustion exhaust gases from said melting furnace and said glass tank furnace, heating a powdery heat exchange substance with said exhaust gases, flowing the thus-heated powdery heat exchange substance in heat exchange relation with a stream of air to preheat said air, and then feeding said preheated air to said furnaces and using it as air for combustion therein.

6. A method according to claim 5, including the step of continuously flowing said powdery heat exchange substance in a closed circuit so that it is preheated by said exhaust gases and then it preheats said air.

7. A method according to claim 5 wherein said powdery heat exchange substance is at least one ingredient for making glass.

8. A method according to claim 6 wherein said powdery heat exchange substance is at least one ingredient for making glass.

9. A method according to claim 7 wherein after preheating said air, said powdery heat exchange substance is fed to said flame means in said melting furnace as an ingredient for making glass.

10. A method according to claim 8 wherein after preheating said air, said powdery heat exchange substance is fed to said flame means in said melting furnace as an ingredient for making glass.

11. A method according to claim 9, wherein after preheating said air, said powdery heat exchange substance is mixed with others of said ingredients, and then that mixture is preheated with exhaust gas that has already been used to preheat a different quantity of said powdery heat exchange substance.

12. A method according to claim 10, wherein after preheating said air, said powdery heat exchange substance is fed to said flame means in said melting furnace as an ingredient for making glass.

13. A method according to claim 7 including the step of feeding carbon, cullet, powdery heat exchange substance that has been used to preheat air and other ingredients into said flame means in said melting furnace.

14. A method according to claim 7 wherein said powdery heat exchange substance is quartz sand.

15. A method according to claim 2, including the steps of discharging high temperature combustion exhaust gases from said melting furnace and said glass tank furnace, heating a powdery heat exchange substance with said exhaust gases, then flowing the thus-heated powdery heat exchange substance in heat exchange relation with a stream of air to preheat said air, and then feeding said preheated air to said furnaces and using it as air for combustion therein.

16. A method according to claim 15, including the step of continuously flowing said powdery heat exchange substance in a closed circuit so that it is preheated by said exhaust gases and then it preheats said air.

17. A method according to claim 15 wherein said powdery heat exchange substance is at least one ingredient for making glass.

18. A method according to claim 16 wherein said powdery heat exchange substance is at least one ingredient for making glass.

19. A method according to claim 17 wherein after preheating said air, said powdery heat exchange substance is fed to said flame means in said melting furnace as an ingredient for making glass.

20. A method according to claim 18 wherein after preheating said air, said powdery heat exchange substance is fed to said flame means in said melting furnace as an ingredient for making glass.

21. A method according to claim 19, wherein after preheating said air, said powdery heat exchange substance is mixed with others of said ingredients, and then that mixture is preheated with exhaust gas that has already been used to preheat a different quantity of said powdery heat exchange substance.

22. A method according to claim 20, wherein after preheating said air, said powdery heat exchange substance is mixed with others of said ingredients, and then that mixture is preheated with exhaust gas that has already been used to preheat a different quantity of said powdery heat exchange substance.

23. A method according to claim 17 including the step of feeding carbon, cullet, powdery heat exchange substance that has been used to preheat air and other ingredients into said flame means in said melting furnace.

24. A method according to claim 17 wherein said powdery heat exchange substance is quartz sand.

* * * * *